(12) United States Patent
Takahashi et al.

(10) Patent No.: US 6,876,115 B2
(45) Date of Patent: Apr. 5, 2005

(54) MAGNETIC FIELD TYPE OF ROTARY ELECTRIC APPARATUS

(75) Inventors: Hideaki Takahashi, Shuuchi-gun (JP); Koichi Sano, Shucchi-gun (JP)

(73) Assignee: Kabushiki Kaisha Moric, Mori-machi (JP)

( * ) Notice: Subject to any disclaimer, the term of this patent is extended or adjusted under 35 U.S.C. 154(b) by 0 days.

(21) Appl. No.: 10/708,133

(22) Filed: Feb. 9, 2004

(65) Prior Publication Data

US 2004/0164635 A1 Aug. 26, 2004

(30) Foreign Application Priority Data

Feb. 14, 2003 (JP) ........................................ 2003-036349

(51) Int. Cl.$^7$ ...................... H02K 21/08; H02K 21/12
(52) U.S. Cl. .................. 310/156.47; 310/216; 310/211
(58) Field of Search ................................ 310/216–218, 310/254, 259, 91, 156.47, 211, 212, 261

(56) References Cited

U.S. PATENT DOCUMENTS

| | | | | |
|---|---|---|---|---|
| 4,616,151 A | * | 10/1986 | Pryjmak | .................... 310/216 |
| 4,642,502 A | * | 2/1987 | Carpenter et al. | ..... 310/156.12 |
| 5,043,616 A | * | 8/1991 | Katsuzawa et al. | ........... 310/91 |
| 5,875,540 A | * | 3/1999 | Sargeant et al. | .............. 29/596 |
| 6,321,439 B1 | * | 11/2001 | Berrong et al. | ............... 29/596 |
| 6,707,209 B2 | * | 3/2004 | Crapo et al. | ........... 310/156.43 |

FOREIGN PATENT DOCUMENTS

| | | | | |
|---|---|---|---|---|
| JP | 63-140645 | * | 6/1988 | ............ 310/156.47 |
| JP | 11-136886 A | | 5/1999 | |
| JP | 2000-308287 A | | 11/2000 | |
| JP | 2001-359266 A | | 12/2001 | |

* cited by examiner

Primary Examiner—Tran Nguyen
(74) Attorney, Agent, or Firm—Ernest A Beutler

(57) ABSTRACT

Several embodiments of rotating electrical machines where cogging torque is reduced as well as the distortion of the back emf and improve torque characteristic with reduced torque ripples by dividing either the permanent magnets and/or the poles of the coil windings in axially separated portions that are circumferentially shifted relative to each other.

8 Claims, 16 Drawing Sheets

Cogging wave single stage

Cogging wave 3 stages skewed

1st order

2nd order

3rd order

4th order

5th order

6th order

7th order

8th order

5th order

6th order

7th order

8th order

9th order

10th order

11th order

12th order

MAGNETIC FIELD TYPE OF ROTARY ELECTRIC APPARATUS

BACKGROUND OF INVENTION

This invention relates to a magnet field type rotary electric apparatus such as an electric motor and a generator and more particularly to an arrangement for improving the performance of such apparatus.

It is known with this type of apparatus that is generally comprised of cooperating, relatively rotatable components one of which is provided with a plural number of circumferentially spaced permanent magnets and the other of which is provided with pole teeth wound with electrical coils reducing the cogging torque is desirable for smooth rotation with low noise and vibration. The cogging torque is produced in relation to the boundary areas and arrangement of the permanent magnets relative to the pole teeth and their coils. Various types of arrangements have been proposed for this purpose. However more can and should be done to improve performance.

For example, reference will be made to several prior art dc motor construction intended for reducing the cogging torque and which still leave much to be desired. For a first example of a prior art attempt, Japanese Published Patent Application JP-A-Hei11-136886 shows an arrangement where the permanent magnets are arranged to in a skewed relation to reduce cogging torque. This construction employs a plural number of approximately arcuate shaped permanent magnet segments spaced apart by gaps. The skew angle that intersects the gap between the permanent magnets is set smaller than the skew angles do not intersect so as to reduce cogging torque. With this type of solution, the achievement of magnetizing with varied skew angles and good accuracy is difficult.

Japanese Published Patent Application JP-A-2001-359266 shows another attempt at reducing the cogging torque by dividing the rotor is axially into a plural number of parts with each part displaced circumferentially around the rotational axis by a mechanical angle corresponding to a half period in relation to each cogging torque. A problem with this solution is that the rotor is merely divided into two parts in the axial direction and displaced by half the period of cogging torque. It cannot be divided into a greater number of stages and also determine an appropriate displacement angle. Therefore it cannot make an effective reduction in the cogging torque.

Yet another attempt is shown in Japanese Published Patent Application JP-A2000-308287 where the rotor core is divided into a plural number of blocks, with each block displaced in the direction of rotation and a thin plate of a non-magnetic material is interposed between the blocks to make an integral body. This construction prevents magnetic flux from leaking among the divided blocks of the rotor core. However, the displacement angle between the number of division stages cannot be determined accurately and effective reduction in the cogging torque cannot be made.

In addition to the aforenoted defects in the prior art constructions, suppression of distortion of the back electromotive force waveform is not considered. Thus performance is not significantly improved because of this added problem.

Therefore it is a principal object of this invention to provide an arrangement for not only reducing cogging torque but also suppressing the distortion of the back electromotive force waveform.

SUMMARY OF INVENTION

This invention is adapted to be embodied in a magnet field type rotary electric apparatus comprised of a rotor and a cooperating stator rotatable relative to each other about an axis. One of the rotor and the stator is comprised of a plurality of circumferentially spaced permanent magnets and the other of the rotor and the stator has a plurality of circumferentially spaced pole teeth surrounded by coil windings. In accordance with the invention, at least one of the plurality of circumferentially spaced permanent magnets and the plurality of circumferentially spaced pole teeth surrounded by coil windings are divided in an axial direction into plurality of stages (n). These stages are circumferentially displaced around the axis at angular intervals of $\Theta$ degrees relative to each other. The displacement angle of $\Theta$ is expressed as $\Theta = 360°/(A \times n)$, where A is the least common multiple of the number of pole teeth and the number of magnets.

DETAILED DESCRIPTION

Figure 1:
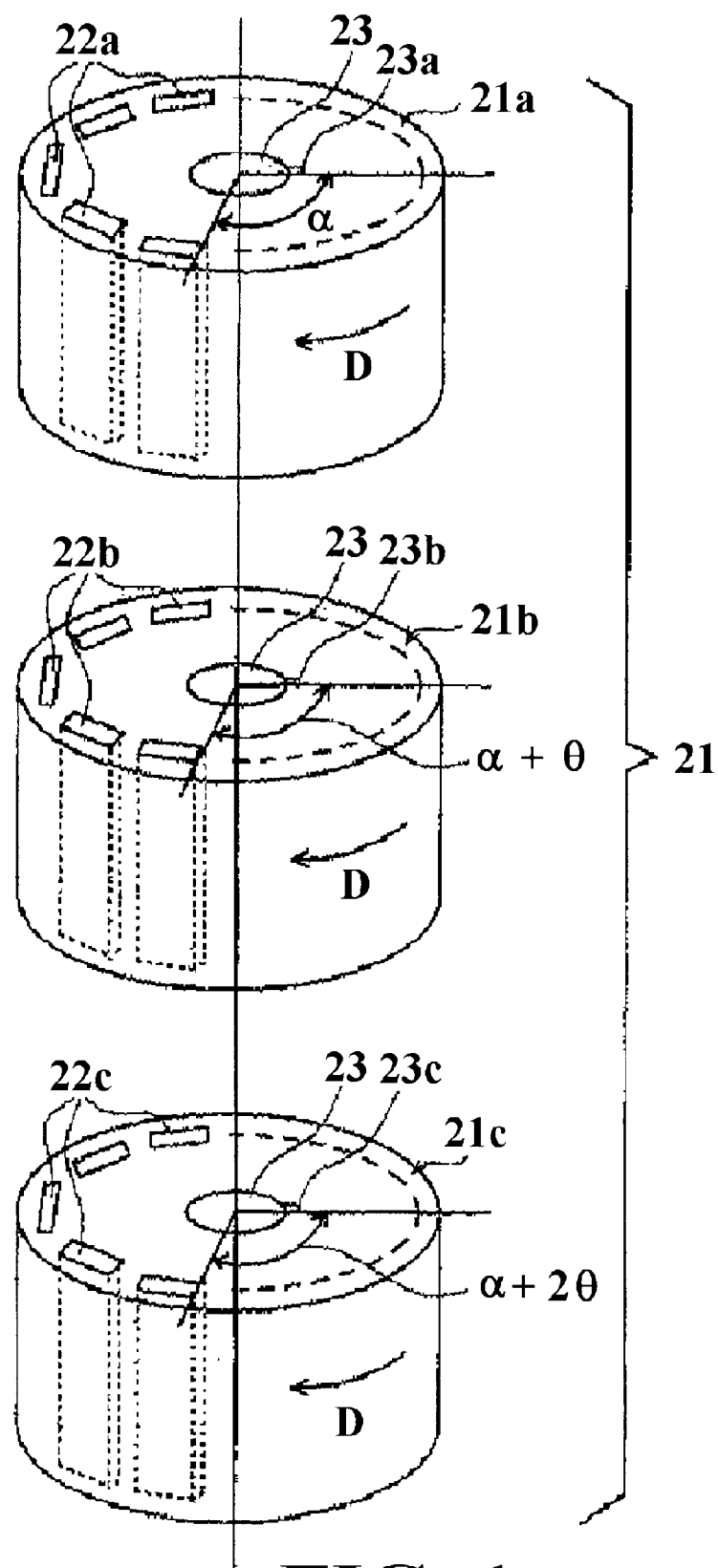
FIG. 1 is an exploded, perspective view of the rotor of a rotating electrical machine embodying the invention.

Referring now in detail to the drawings and initially to FIG. 1, this shows an exploded perspective view of a rotor core, indicated generally by the reference numeral 21, skewed in three stages according to the present invention. Only the rotor 21 of the associated rotary electrical machine is shown, as the remaining components of the machine may be of any suitable construction. That is, it is believed that the following description will readily permit those skilled in the art how to practice the invention in a complete machine, be it a motor or a generator. Also although the description will be of embodiments where the permanent magnets are positioned in axially spaced, circumferentially staggered relationship, as will be described, the cores around which the electrical coils are wound may be formed in such a staggered, axially spaced relation or both elements may be formed in such a fashion.

In this embodiment, the rotor core 21 is made up of three axially spaced, cylindrically core sections 21a, 21b, and 21c positioned along the axis of a shaft C. Each of the divided core sections 21a, 21b, and 21c is made of laminated steel plates provided with, for example 12, pieces of identical, plate-like permanent magnets 22 embedded along the peripheral edge portion at uniform intervals to constitute an equally distributed IPM type three stage skewed rotor 21. As with the core sections, the magnets of each section are like identified (22a, 22b and 22c).

Each core piece 21 is provided with a respective shaft hole 23 is a for inserting a rotor shaft (not shown). Each of the divided core sections 21a, 21b, and 21c is non-rotatably secured to the rotor shaft by means of a respective key (not shown) by means of key ways 23a, 23b and 23c, respectively.

The divided core sections 21a, 21b, and 21c are circumferentially staggered, as shown by the arrows D by a displacement angle α. For example, a permanent magnet 22a located at an angle α from a reference position (for example the key way 23a) in the topmost core section 21a. A like corresponding permanent magnet 22b in the second core section 21b is displaced by a displacement angle of α+Θ. The final corresponding permanent magnet 22c in the lowermost core section 21c is displaced by a displacement angle of α+2Θ.

Figure 2:
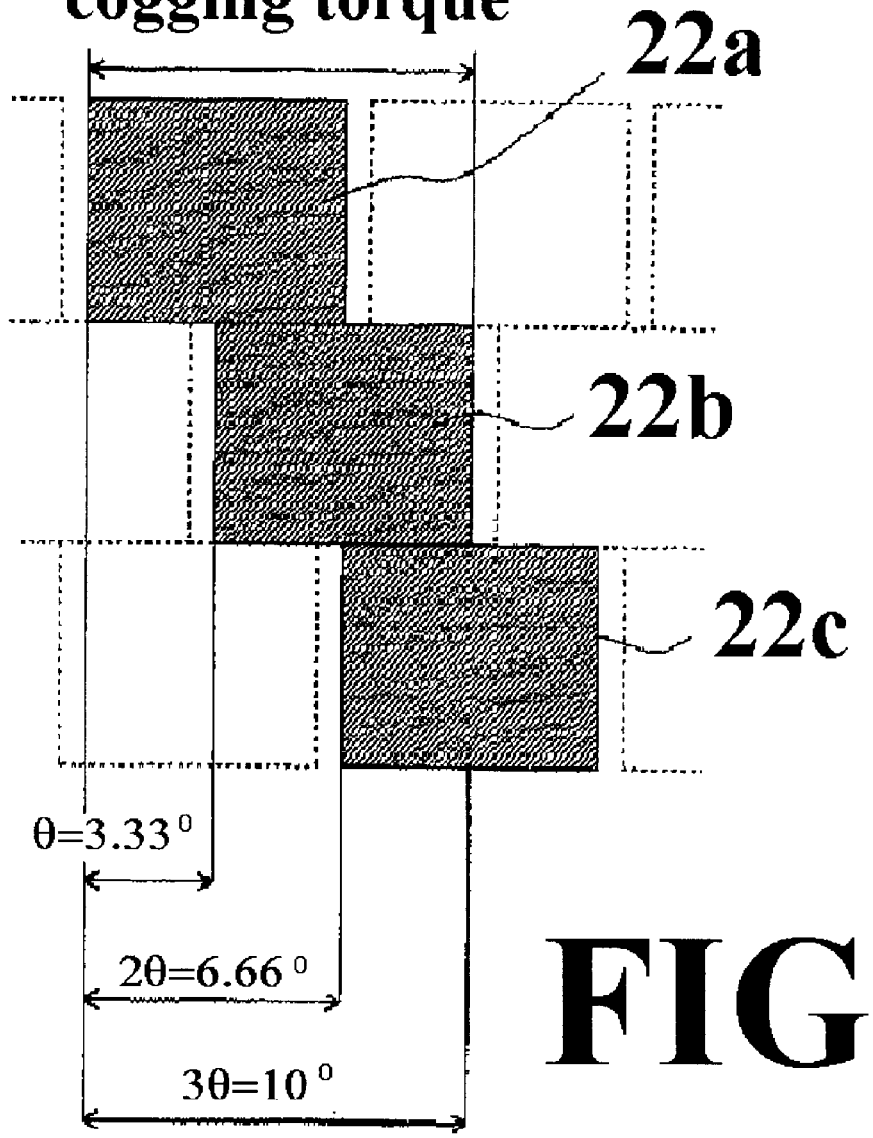
FIG. 2 is a developed view of the rotor, shoving the over-lapping relationship of the rotor magnets and their staggered relationship.

This circumferential staggering of the magnets is better shown in the developed view of FIG. 2. as seen there the three magnets 22a, 22b, and 22c constituting one skewed division of the three stages are displaced relative to adjacent magnets by an angle Θ of 3.33 degrees. Thus the third stage magnet 23c is displaced from the magnet 23b by 3.33 degrees and from the magnet 23 a by 6.66 degrees.

When the example motor shown in FIG. 1 has 12 poles and cooperates with a core having 18 wound pole teeth defining 18 slots, one period T of the cogging torque is as follows: T=360°/(least common multiple of the numbers of slots and poles)=360°/36=10°.

Thus the angle θ in the case of a three stage skew is approximately equal to the period T divided by three, i.e. 10°/3=3.33°.

In other words, assuming the least common multiple of the numbers of slots and poles to be A and the number of the rotor core divisions to be n, the displacement angle Θ is found to be as follows: Θ=360°/(A×n).

Figure 3:
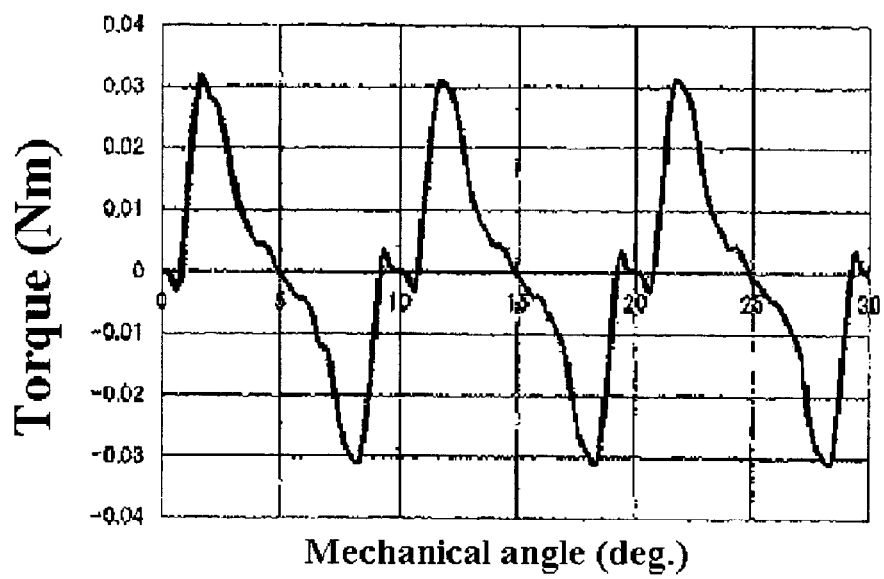
FIG. 3 is a graphical view showing the cogging torque of a single stage machine.
Figure 4:
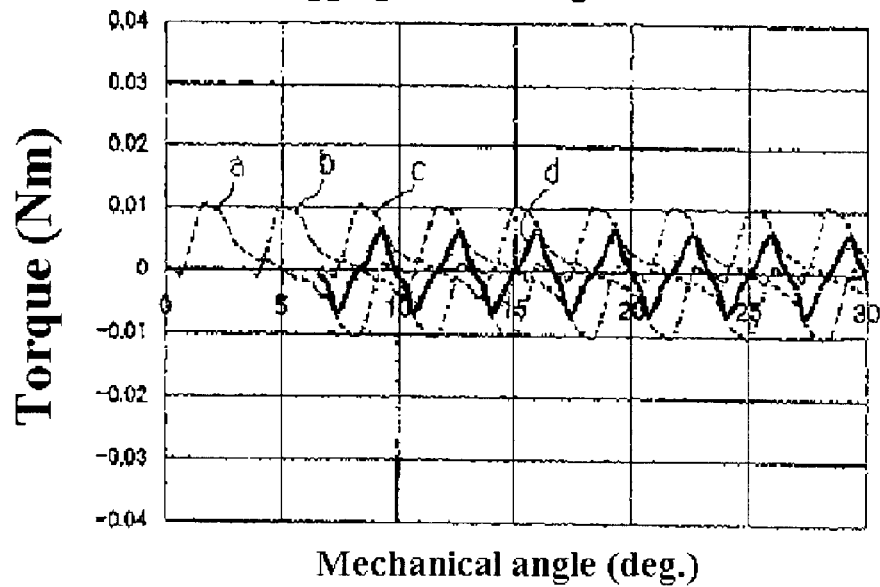
FIG. 4 a graphical view showing the cogging torque of all stages of a first embodiment and the net cogging torque to show the reduction effected by the staggered relationship.

The effect of an embodiment rotor skewed in three stages may be understood by reference to FIGS. 3 and 4 where FIG. 3 is a graph for a single stage rotor without skewing, with an undivided rotor core, and FIG. 4 is a graph for a rotor skewed in three stages. As seen in FIG. 3, the cogging waveform of a single stage machine repeats itself at a period of 10 degrees. The vertical (peak to peak) width of the waveform is 0.062 Nm. The vertical width corresponds to the intensity of the cogging torque.

With this embodiment of the invention and as seen in FIG. 4, waveforms a, b, and c indicated with broken lines are produced respectively from the three divided core sections. The broken line waveforms a, b, and c are displaced from each other by 3.33 degrees and each has a period of 10 degrees. A waveform d shown with a bold line for the entire rotor results from the sum of the three waveforms a, b, and c (a+b+c). The vertical (peak-to-peak) width of the waveform d corresponding to the cogging torque intensity is 0.013 Nm. In other words, it is shown that the cogging torque is greatly reduced by skewing the magnets 23 in three stages.

Figure 5:
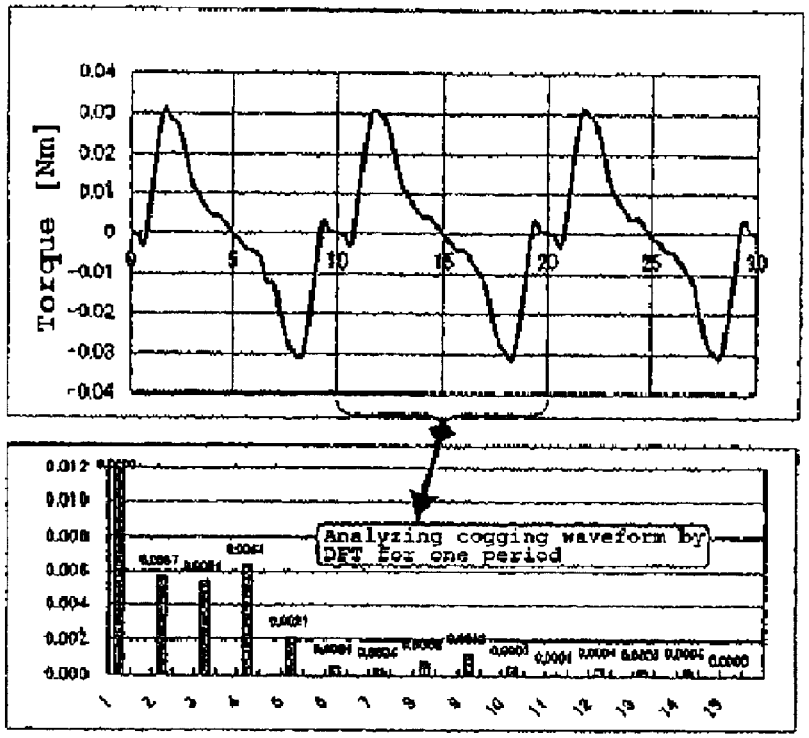
FIG. 5 is a graphical view, like FIG. 3 showing the cogging torque of the single stage machine and the waveform analysis for a single cogging period.
Figure 6:
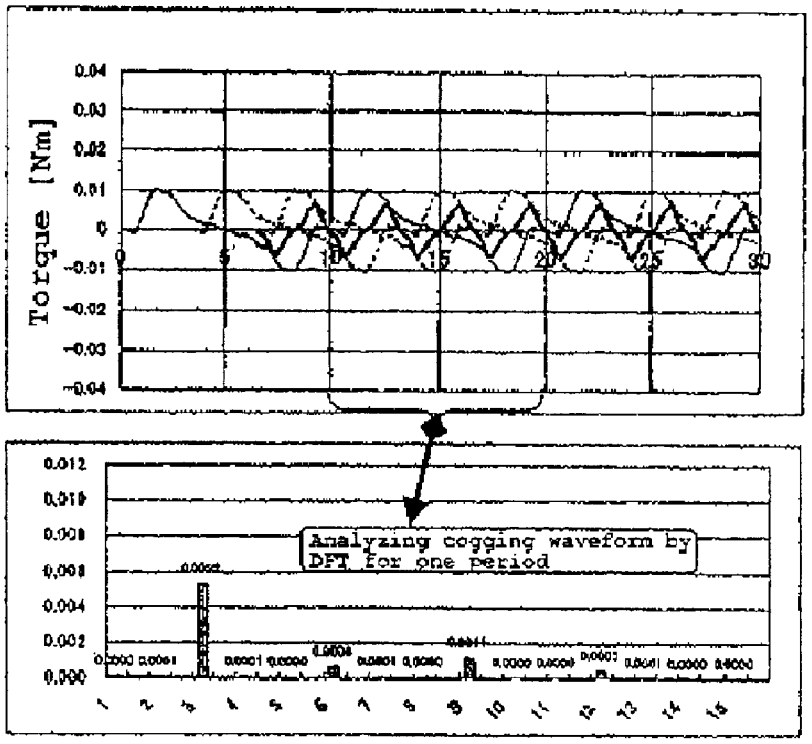
FIG. 6 is a graphical view, like FIG. 4 showing the cogging torque of all stages of the embodiment and the waveform analysis for a single cogging period.

FIGS. 5 and 6 show, respectively, a method of analyzing the cogging waveforms shown in FIGS. 3 and 4. This method is a frequency analysis using the discrete Fourier transform (DFT). FIG. 5 is a graph for a conventional single stage rotor without skewing, with an undivided rotor core. FIG. 6 is a graph for a rotor skewed in three stages in accordance with the embodiment of FIGS. 1 and 2.

Referring now specifically to these figures, when one period of the cogging waveform of FIG. 5 is analyzed using the DFT, cogging appears in every number of order (horizontal axis). In the case of a single stage, cogging components of all orders are combined into a cogging torque of the whole as will be seen by reference to FIGS. 7 to 9 which will be described in detail shortly.

On the other hand, with the described embodiment of FIGS. 1 and 2 and as shown in FIG. 6, cogging appears only in the order numbers of 3, 6, 9, . . . , the multiples of three. Cogging components in other order numbers disappear as offset among divided cogging waveforms. As a result, cogging of the whole skewed in three stages is reduced as will become apparent by reference to FIGS. 10 to 12 which will be described shortly.

Figure 7:
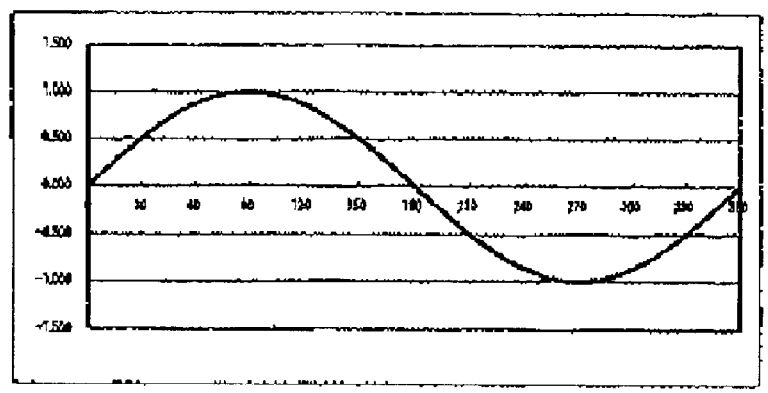
FIGS. 7 through 9 show 12 orders of magnitude of the waveform of a single stage machine derived using a Fourier transformation.
Figure 7:
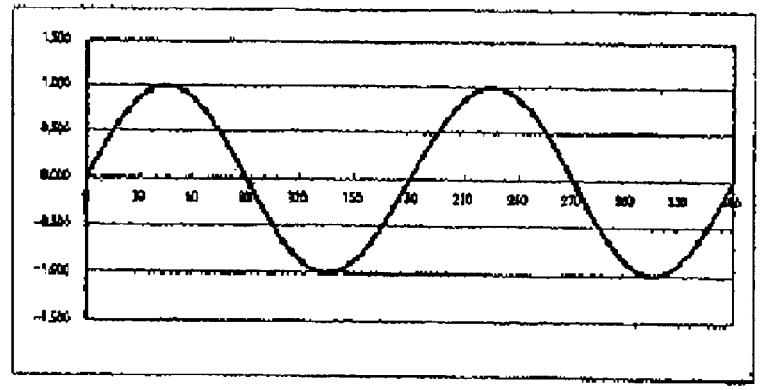
Figure 7:
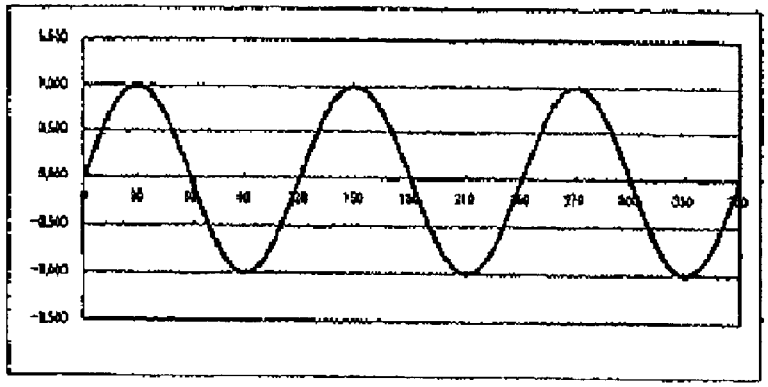
Figure 7:
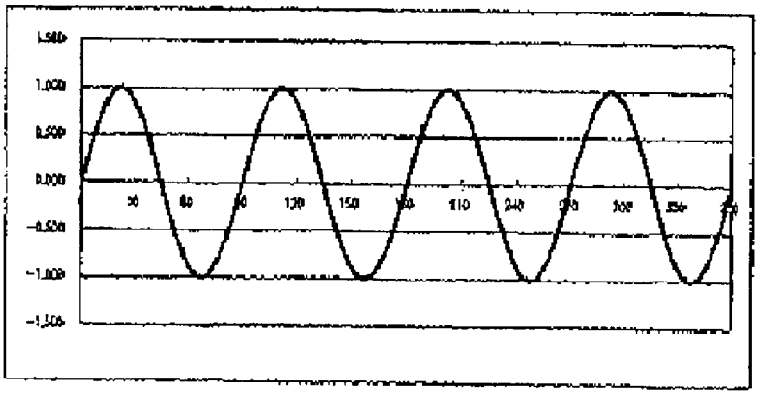
Figure 8:
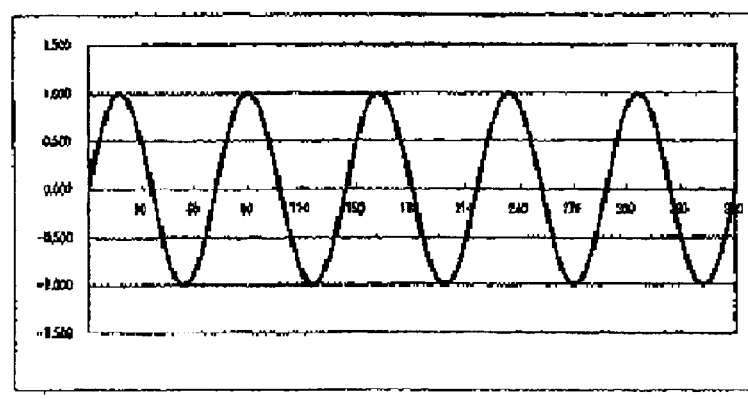
Figure 8:
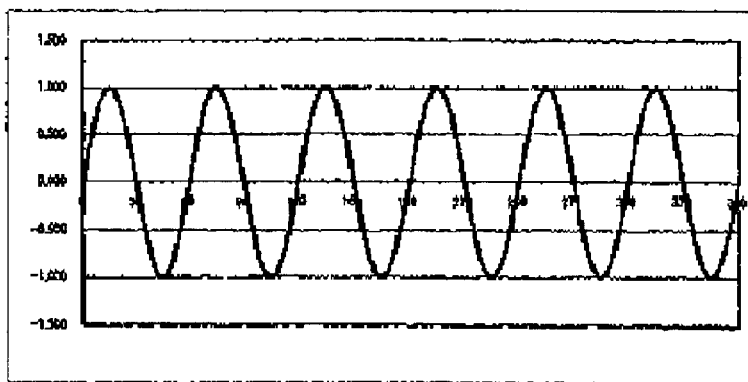
Figure 8:
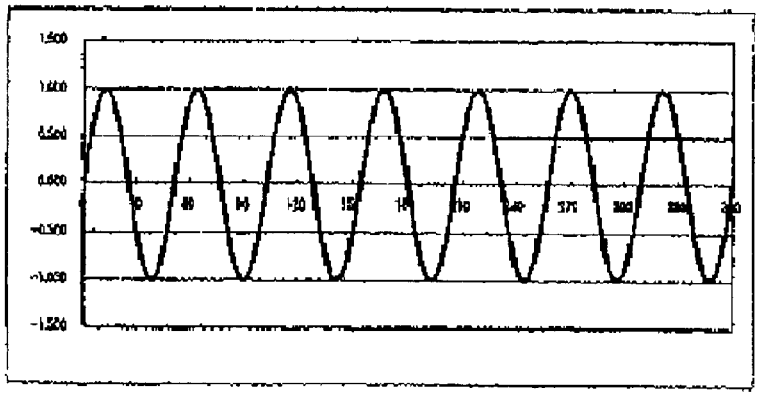
Figure 8:
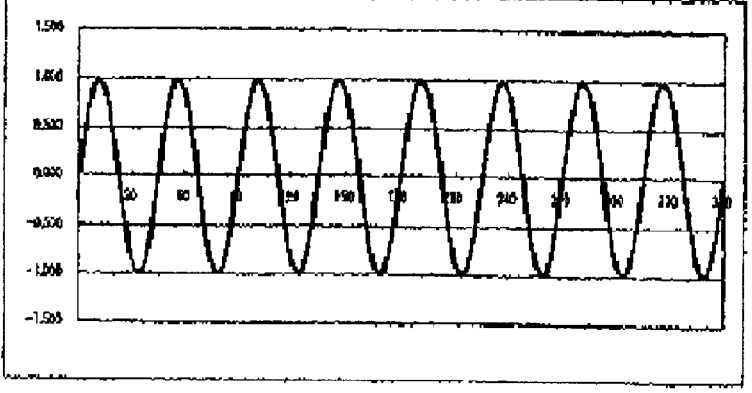
Figure 9:
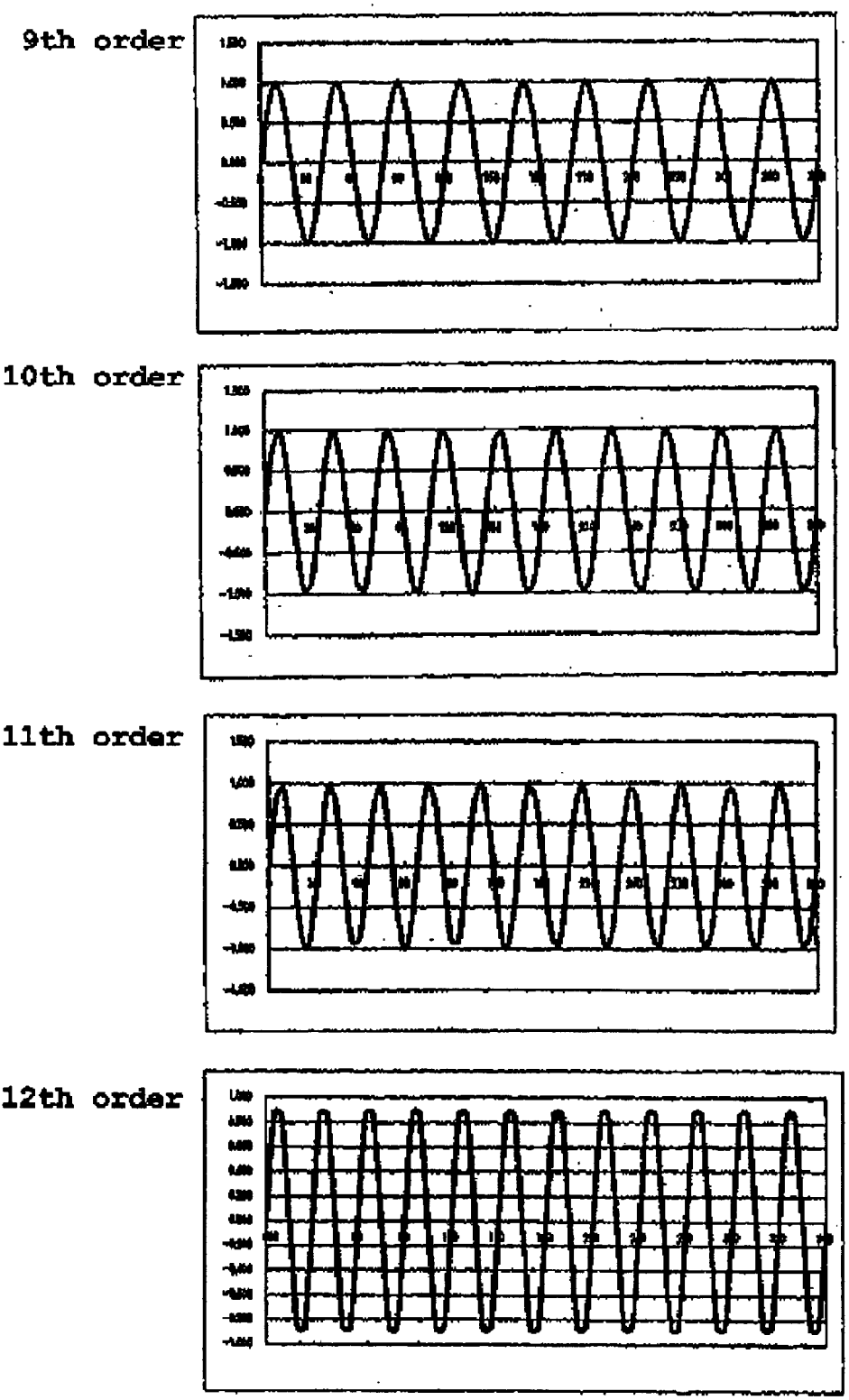

FIGS. 7 to 9 show the sine waveform models of cogging in respective orders when the single stage rotor of FIG. 5 is analyzed using Fourier transform. As shown, cogging appears in each of the 1st to 12th orders. The cogging waveforms in respective orders correspond to the cogging in respective orders in the graph of FIG. 5 described above.

Figure 10:
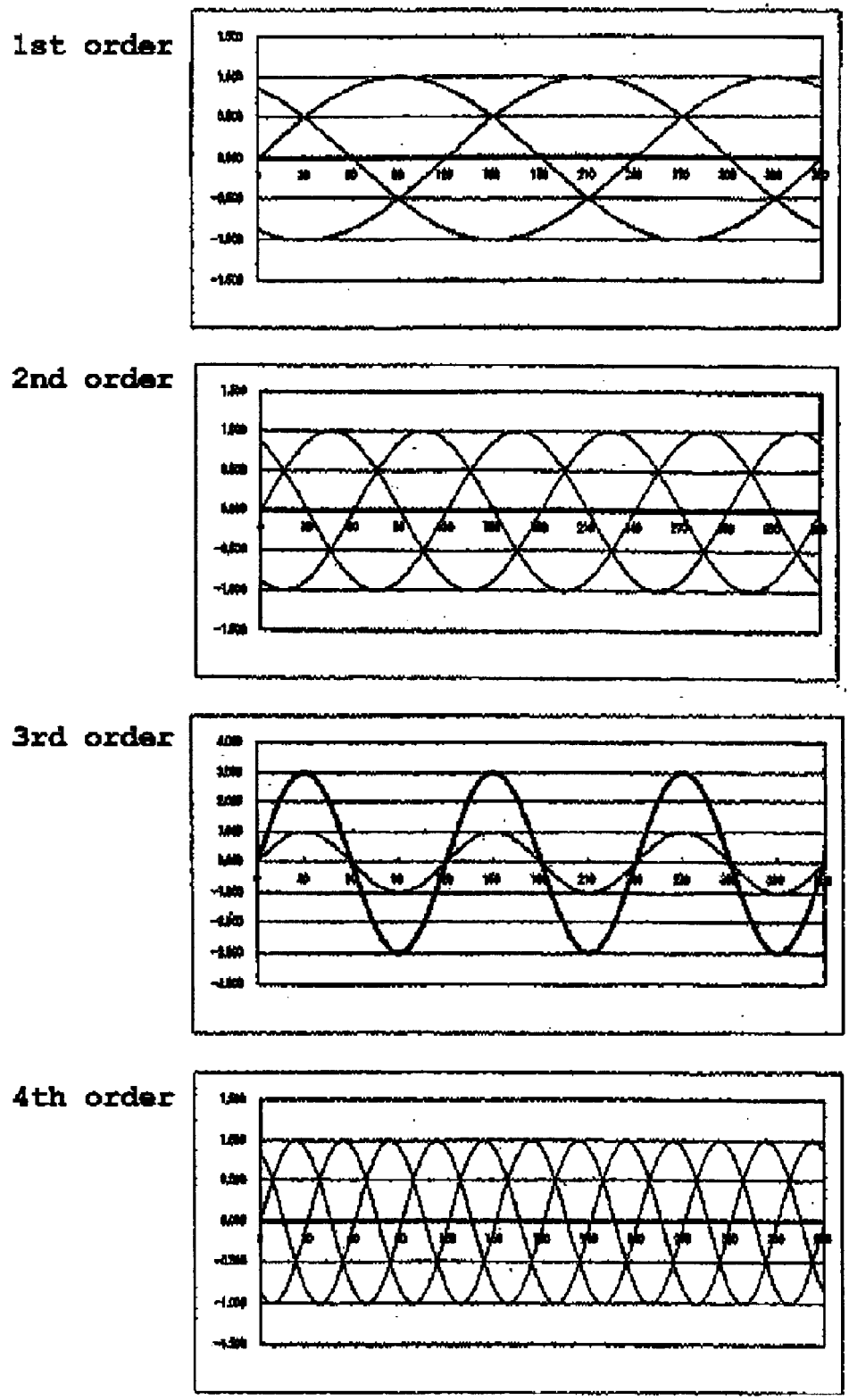
FIGS. 10 through 12 show 12 orders of magnitude of the waveform of all stages of the embodiment derived using a Fourier transformation.
Figure 11:
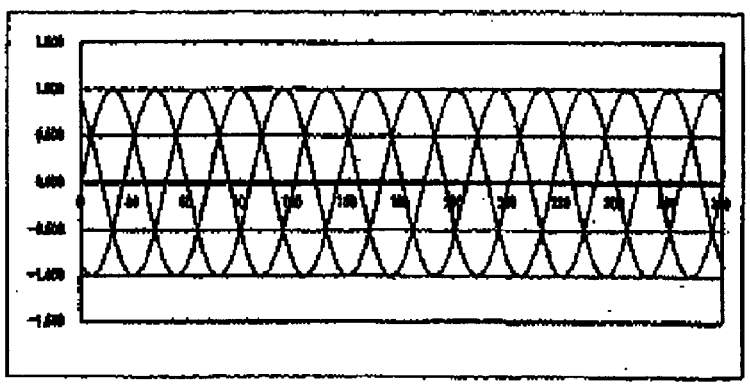
Figure 11:
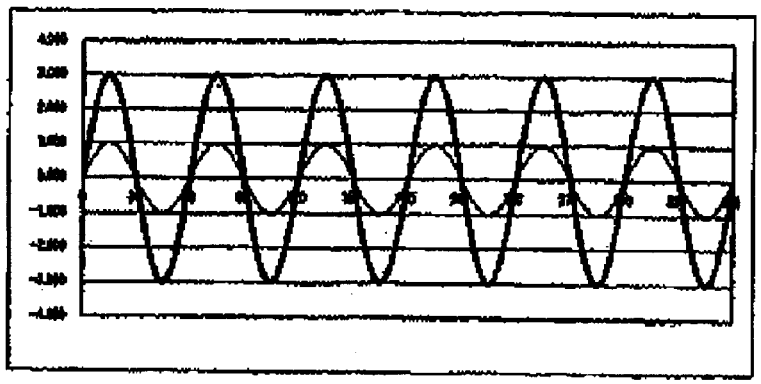
Figure 11:
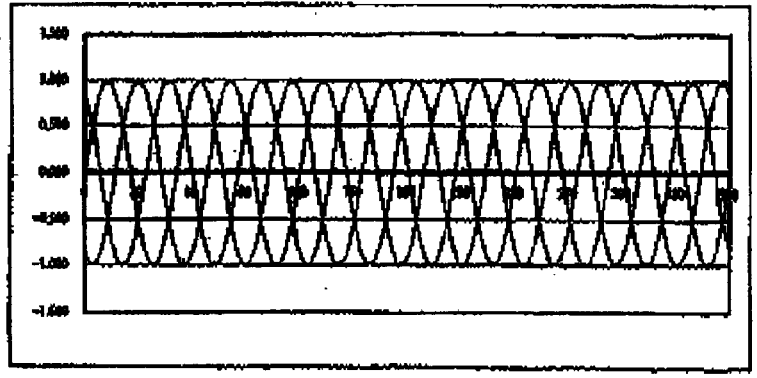
Figure 11:
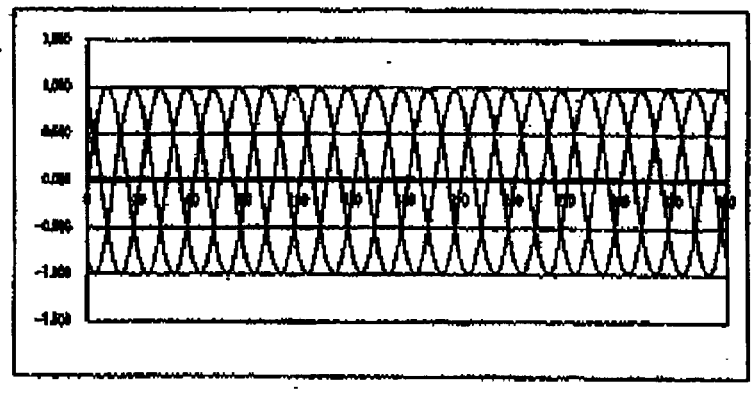
Figure 12:
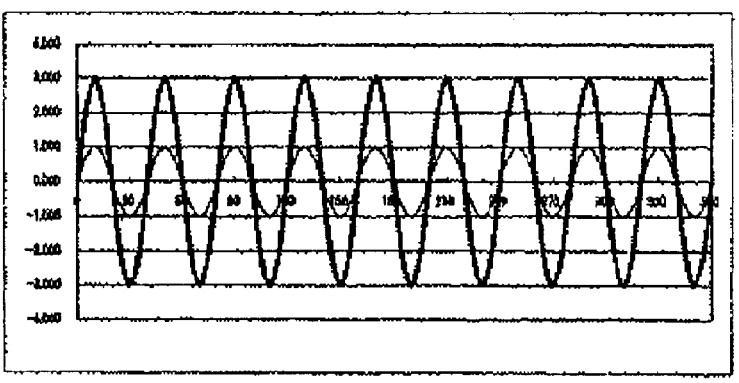
Figure 12:
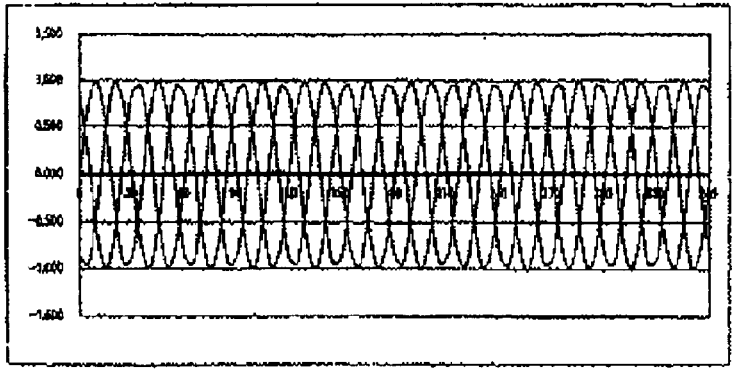
Figure 12:
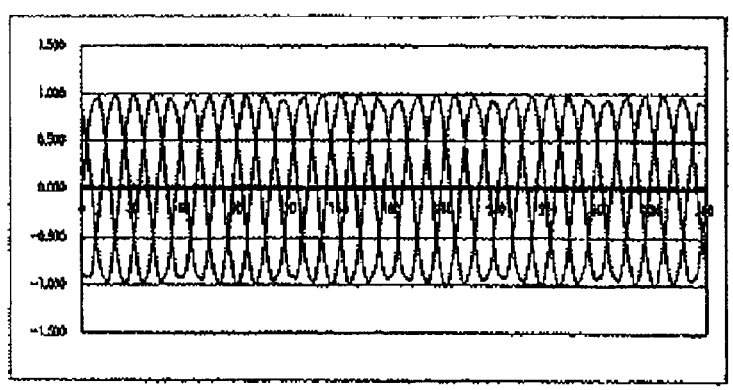
Figure 12:
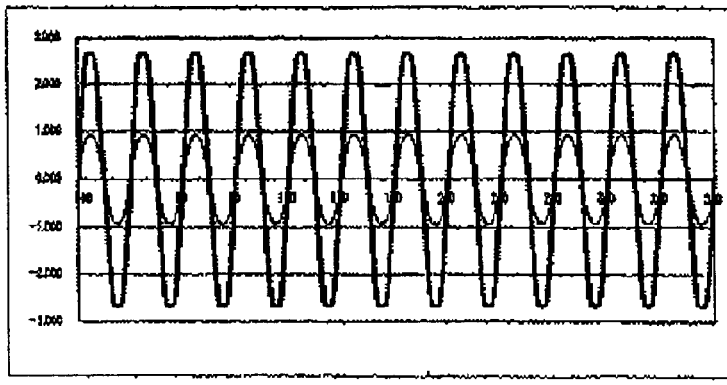

FIGS. 10 to 12 show the sine waveform models of cogging in respective orders when the three-stage-skewed rotor of the embodiment of FIG. 6 is analyzed using Fourier transform. As shown, in the orders of other than multiples of three: 1st, 2nd, 4th, 5th, 7th, 8th, 10th, and 11th, when waveforms (in thin lines) divided into three are superimposed, they represent zero as shown with a bold line. On the other hand, in the orders of 3rd, 6th, 9th, and 12th, all the divided three waveforms (in thin lines) are superimposed and appear as a sum in a magnitude of three times as shown with a bold line. Therefore, cogging appears in the orders of multiples of three. The cogging corresponds to that in the order numbers of multiples of three in the graph of FIG. 6 described above.

Figure 13:
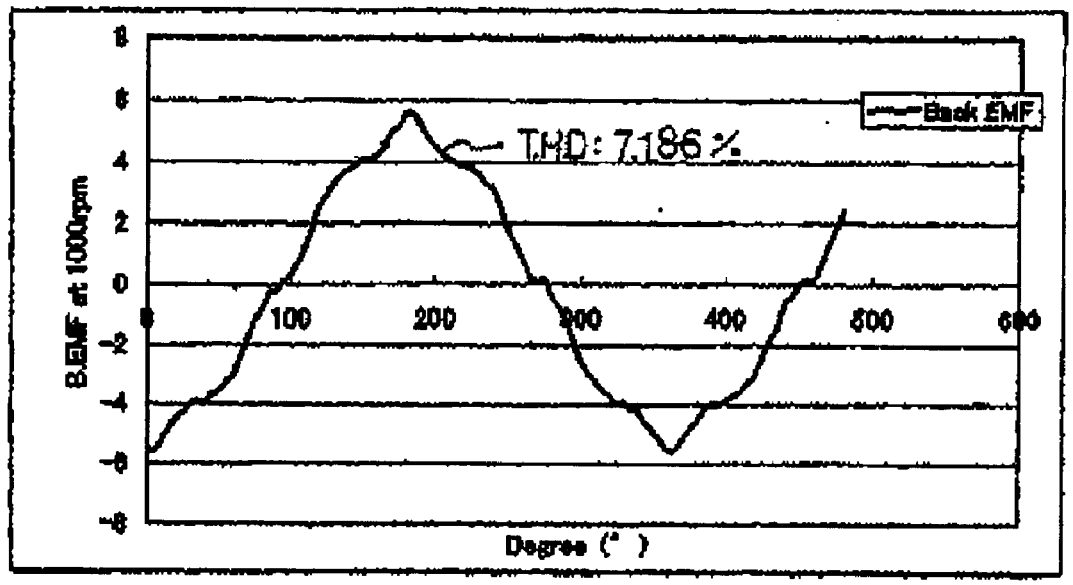
FIG. 13 shows the back electromotive force (BEMF) of a single stage machine.
Figure 14:
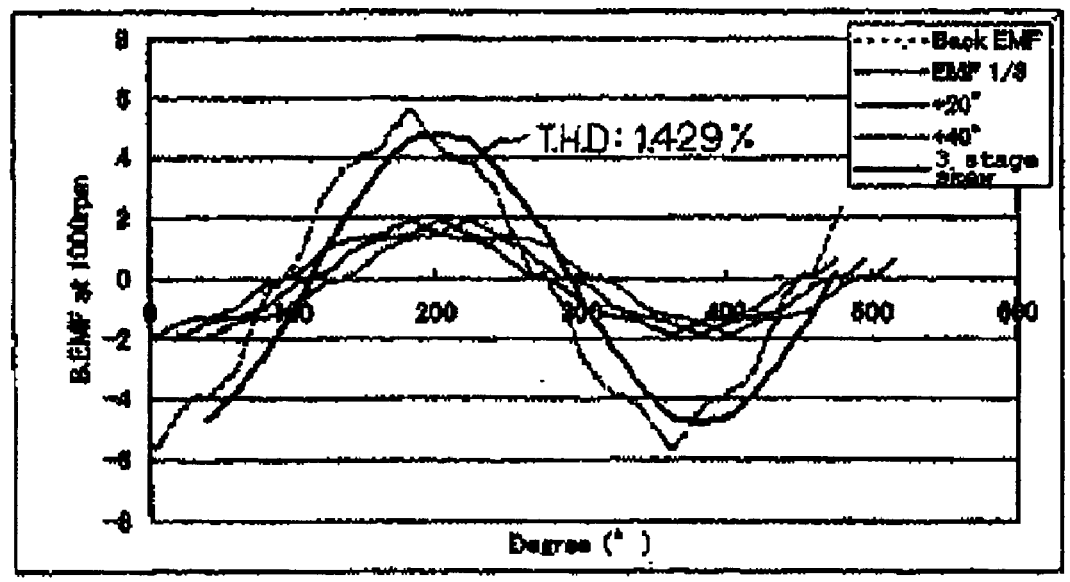
FIG. 14 shows the back electromotive force (BEMF) of all stages of the embodiment and the sum thereof to show how the shape is smoothed.

FIGS. 13 and 14 shows the waveform of the back electromotive force (back EMF). FIG. 13 is a graph for a conventional single stage rotor without skewing, and FIG. 14 is a graph for a rotor skewed in three stages in the embodiment of FIGS. 1 and 2. As seen in FIG. 13, the waveform is greatly distorted in comparison with that of a sine waveform, with a great distortion rate of back electromotive force (T.H.D.) of 7.186%. On the other hand, as seen in FIG. 14, the waveform for the three stage skewing as in the Embodiment of FIGS. 1 and 2 shown with a bold line is nearly a sine waveform in comparison with that of FIG. 13, with a greatly reduced distortion rate of back electromotive force (T.H.D.) of 1.429%.

Figure 15:
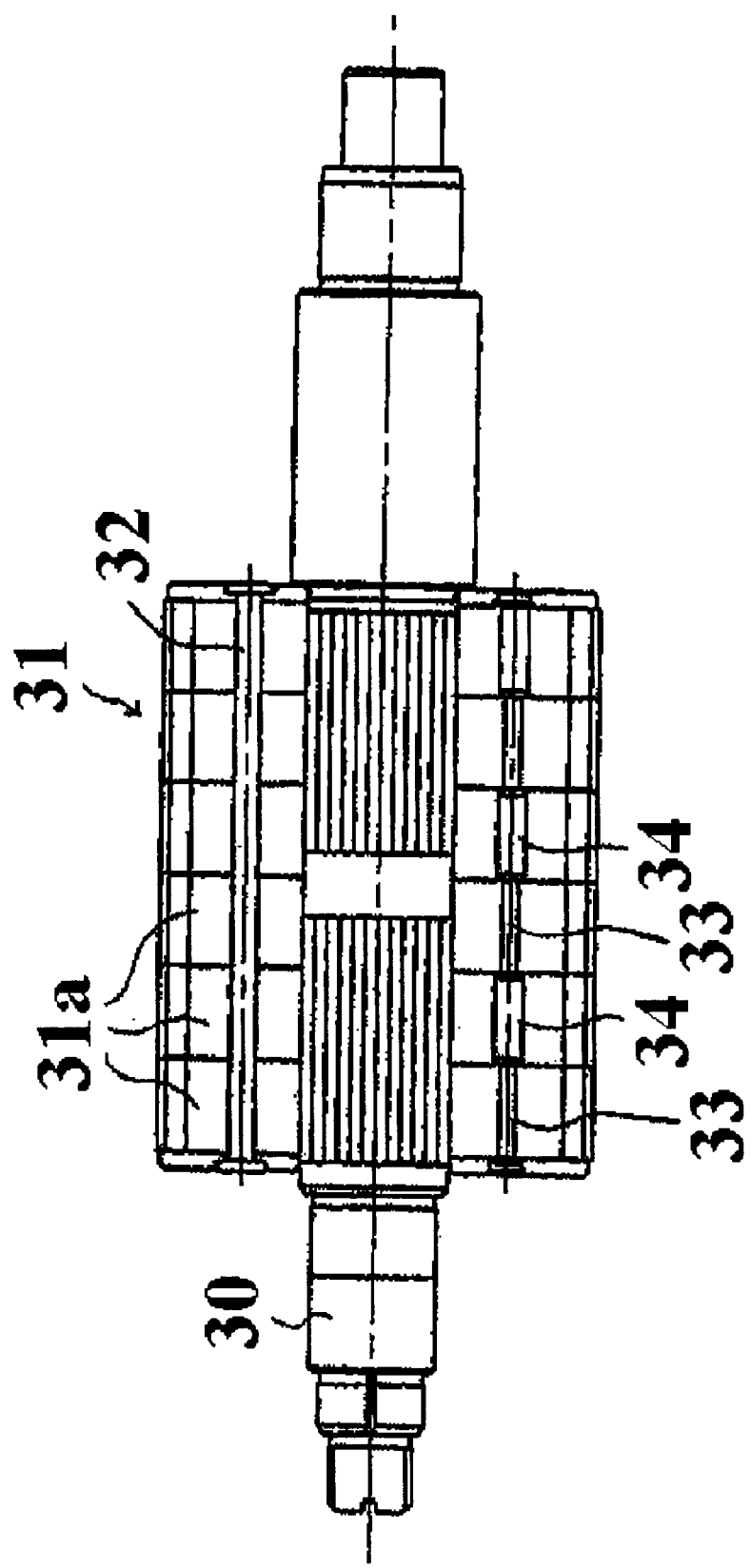
FIG. 15 is a side elevational view of a rotor of a six stage embodiment of the invention.
Figure 16:
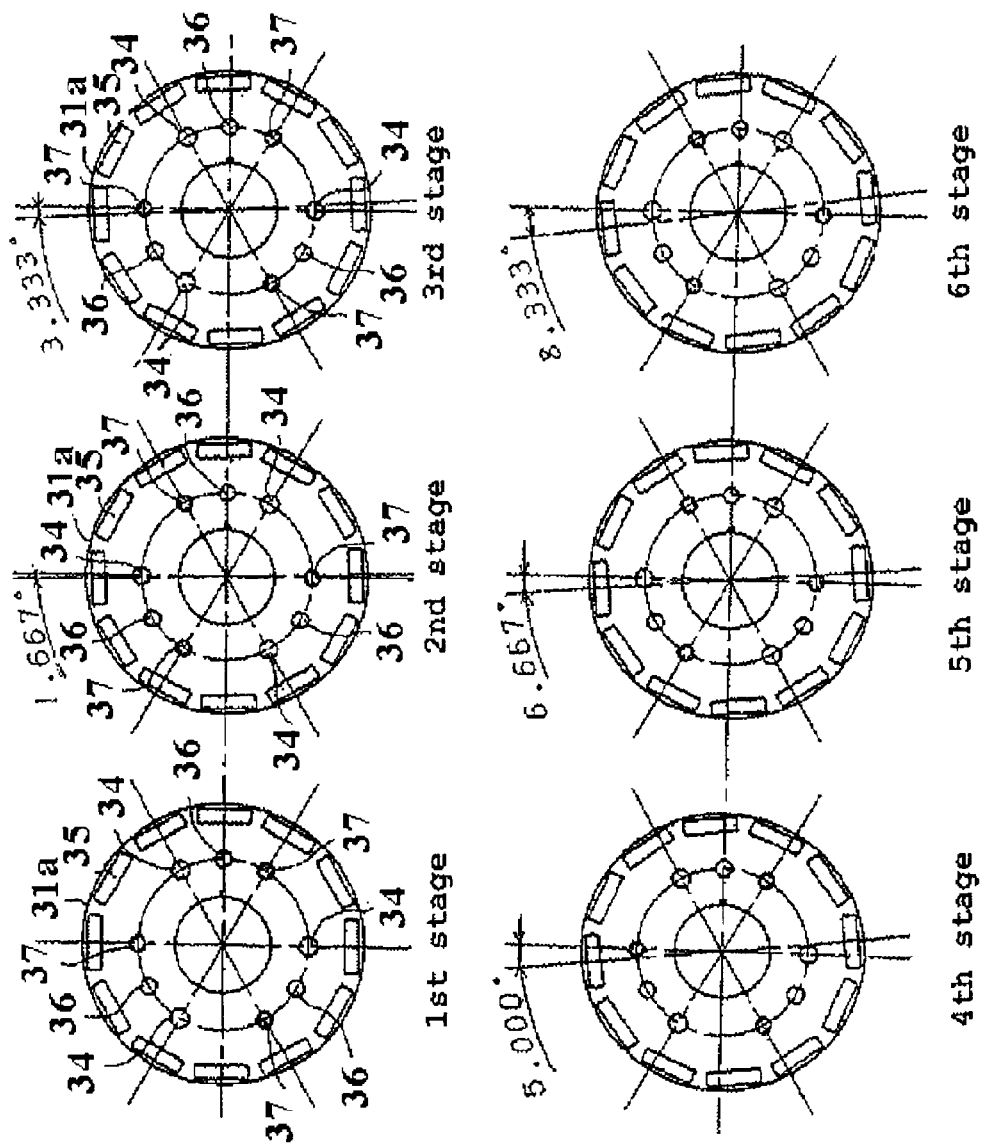
FIG. 16 is a group of end elevational views of each of the stages shown in FIG. 15 to illustrate the angular offset of the magnets of the stages.
Figure 17:
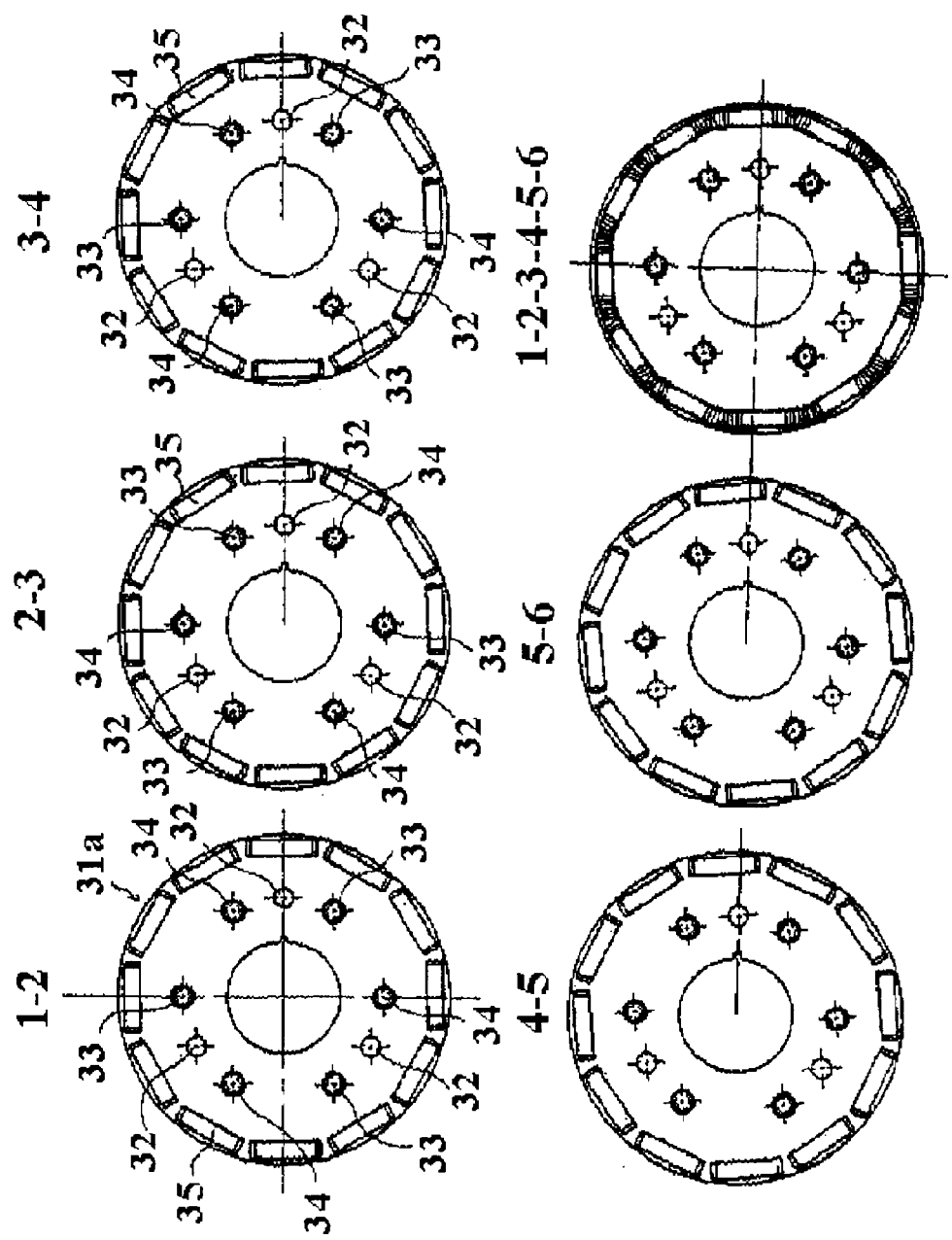
FIG. 17 is a group of end elevational views, in part similar to FIG. 16, but showing adjacent stages superimposed on each other and the superimposition of all stages.

Referring now to FIGS. 15 to 17 show the constitution of a rotor skewed in six stages in accordance with another embodiment of the invention. Again in this embodiment only the rotor, indicated generally by the reference numeral 31 is illustrated. As with the previously described embodiment of FIGS. 1 and 2, it can cooperate with a wound core of any conventional or desired construction.

The rotor core 31 made up of six divided pieces is secured integrally with a rotor shaft 30. The rotor core 31 is made up of six axially divided pieces 31*a* non-rotatably joined together in a suitable manner such as by rivets 32 that pass through aligned apertures in each piece 31*a*. Each divided core section 31*a* is made by laminating steel plates joining together using small rivets 33 that pass through aligned holes of only the laminations of the respective piece 31*a*. The small rivets 33 of adjacent stages are provided in positions circumferentially displaced from each other. A divided core section opposite a rivet position is bored with a clearance hole 34 to clear the head of the rivet 33 joining the laminations of the adjacent piece 31*a*.

In this embodiment, twelve magnet receiving holes 35 are formed in the peripheral portion of each divided core section 31*a*, to receive and retain permanent magnets such as flat plate-like permanent magnets (not shown).

As previously noted, a stator (not shown) is placed around the outer periphery of the rotor core 31 so as to constitute for example a dc motor. The stator (not shown) has a stator core for example with 18 pole teeth radially extending from the outer periphery of the rotor around which 18 coils are wound. This forms 18 slots into which the coil windings extend. The magnetic plane of each coil is positioned to face the permanent magnets of the rotor. Thus, a dc motor with 18 slots and 12 magnetic poles is formed.

As shown in FIG. 16, each of the divided core sections 31*a* is bored with through holes. These comprise three insertion through holes 36 for the through rivets 32 for joining all the six stages; three insertion through holes 37 for the small rivets 33 for joining together the laminated steel plates for each stage; and the three clearance holes 34 for clearing the heads of the small rivets 33 of an adjacent stage.

As shown in FIG. 16, when the through rivets 32 inserted through the insertion holes 36 are fixed in position, the positions of the permanent magnets of each divided core sections 31*a* (magnet receiving holes 35) are displaced counterclockwise by 1.667 degrees from one stage to another. Therefore, when the stages are superimposed by adjacent pairs as shown in FIG. 17, the magnet receiving holes 35 are circumferentially displaced.

As described in connection with the embodiment of FIGS. 1 and 2, the displacement angle $\Theta$ can be found as $\Theta=360°/(A\times n)$. In this embodiment, A (the least common multiple of the numbers of slots and poles)=36, and n (the number of divided stages)=6, so that $\Theta=360°/(36\times 6)=1.667°$.

Figure 18:
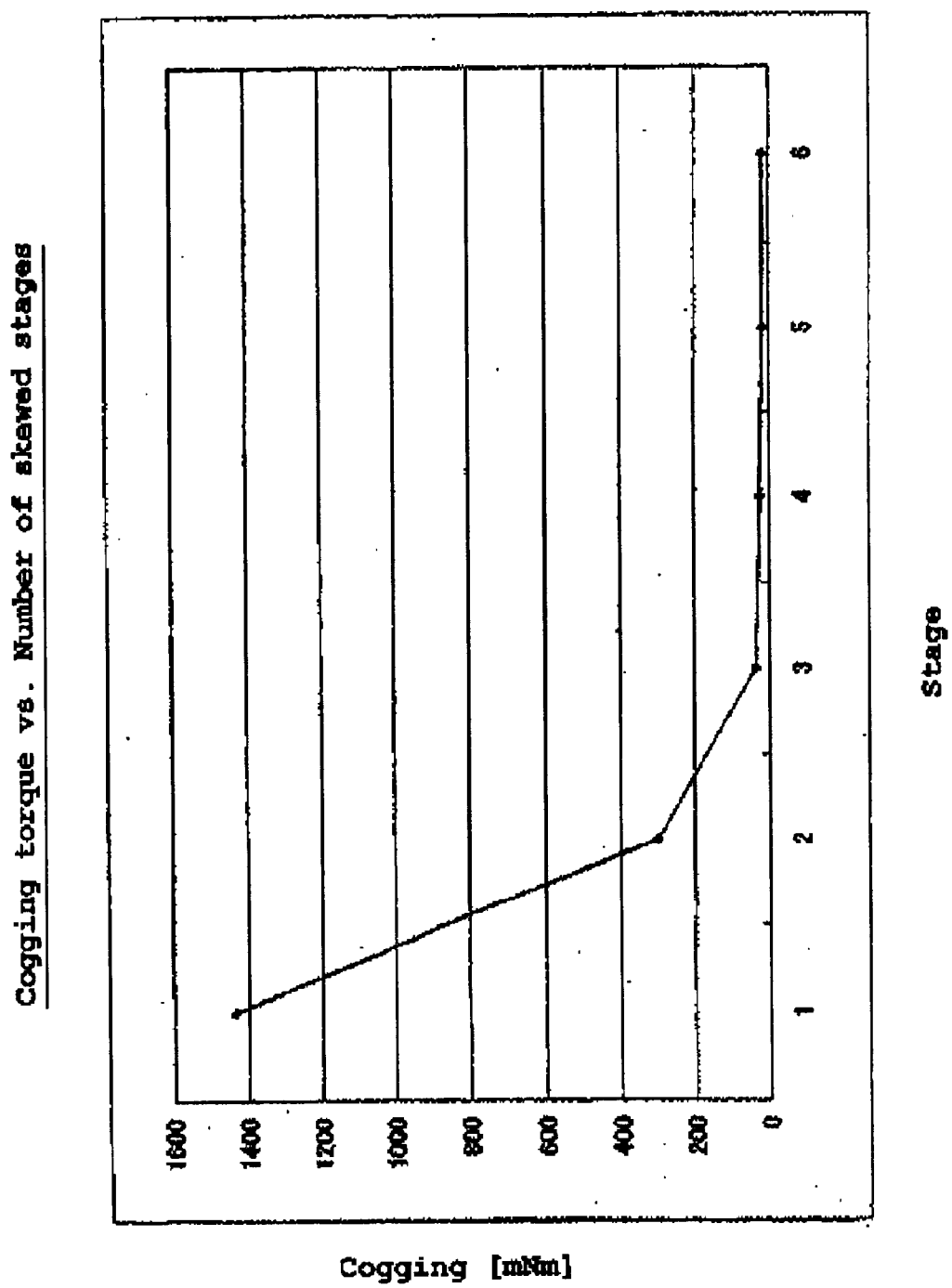
FIG. 18 is a graphical view showing how the cogging torque is affected by varying the number of offset stages.

FIG. 18 is a graph showing the relationship between the cogging torque and the number of skewed stages. From this it will be seen that the cogging torque can be reduced to a maximum extent by making the number of stages three or more.

Figure 19:
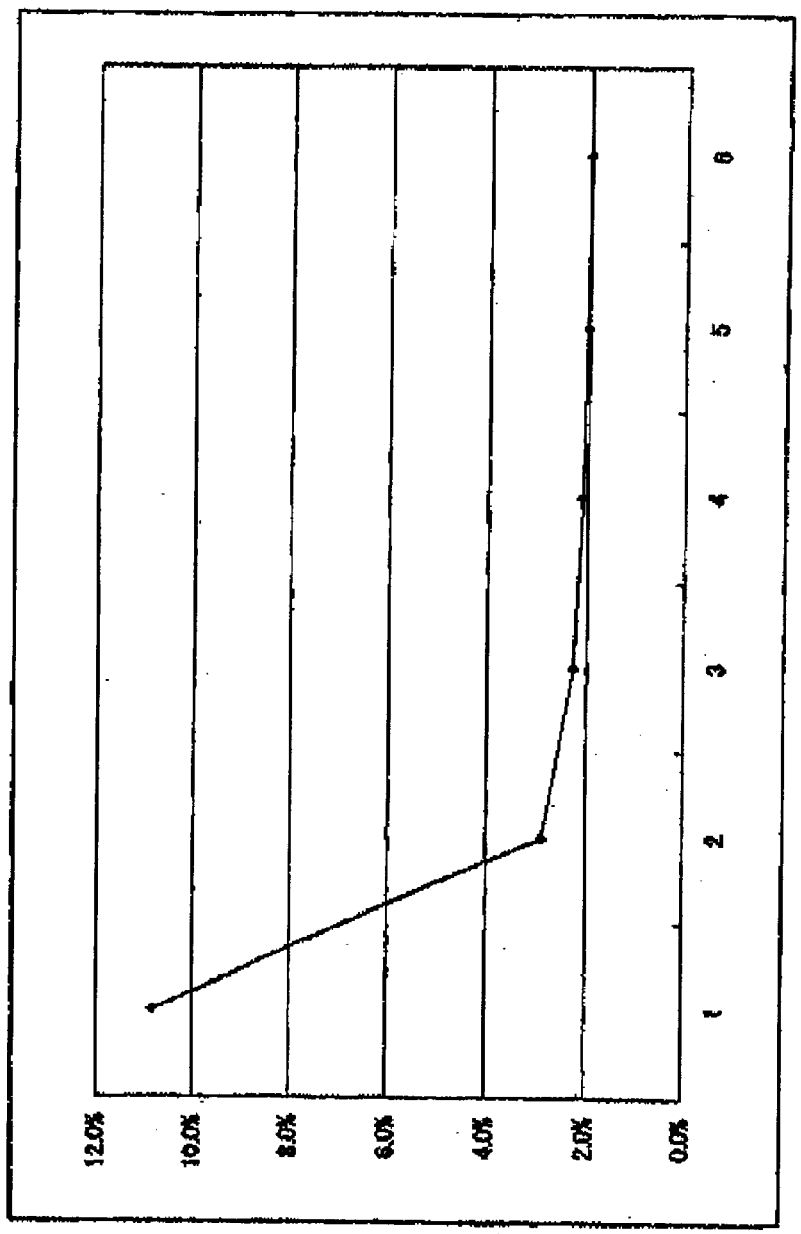
FIG. 19 is a graphical view showing the relationship of the back emf to the number of offset stages.

FIG. 19 is a graph of the relationship between the distortion rate (THD) of the motional electromotive force (back electromotive force) and the number of the skewed stages. Again it will be seen that the distortion rate of the back electromotive force can be reduced by to a maximum extent by making the number of stages to be three or more.

From the foregoing description it should be readily apparent that by making the permanent magnet element from a plural number of skewed, divided core sections it is possible to reduce cogging torque specifically by an appropriate determination of the displacement angle $\Theta$ of the divided core sections according to the number n of the divided stages. In addition, the back electromotive force can be reduced or even eliminated by the setting of the displacement angle $\Theta$ according to the number n of the divided stages. Thus in accordance with the invention, by using an arrangement that is skewed in n stages, harmonics other than components of multiples of n-th order of the cogging waveform for one period are offset and disappear and cogging torque is greatly reduced. This arrangement also makes it possible to reduce the distortion rate of the back electromotive force, to make the electromotive force waveform approximate a sine waveform, to improve torque characteristic with reduced torque ripples, to restrict vibration and noise from occurring, and to improve operation performance.

As has been previously noted this effect can also be obtained by skewing plural axially separated stages of wound pole teeth or a combination of both.

Of course those skilled in the art will readily understand that the described embodiments are only exemplary of forms that the invention may take and that various changes and modifications may be made without departing from the spirit and scope of the invention, as defined by the appended claims.

What is claimed is:

1. A magnet field type rotary electric apparatus comprised of a rotor and a cooperating stator rotatable relative to each other about an axis, one of said rotor and said stator being comprised of a plurality of circumferentially spaced permanent magnets and the other of said rotor and said stator having a plurality of circumferentially spaced pole teeth surrounded by coil windings, at least one of said plurality of circumferentially spaced permanent magnets and said plurality of circumferentially spaced pole teeth surrounded by coil windings being divided in an axial direction into plurality of stages (n) each of which is circumferentially displaced around said axis at angular intervals of $\Theta$ degrees relative to each other, said displacement angle of $\Theta$ is expressed as $\Theta=360°/(A\times n)$, where A is the least common multiple of the number of pole teeth and the number of magnets.

2. A magnet field type rotary electric apparatus as set forth in claim 1 wherein $n \geq 3$.

3. A magnet field type rotary electric apparatus as set forth in claim 1 wherein the permanent magnets are divided in the axial direction.

4. A magnet field type rotary electric apparatus as set forth in claim 3 wherein the permanent magnets of each individual core division are carried by a laminated core.

5. A magnet field type rotary electric apparatus as set forth in claim 4 wherein the laminations of each of the individual core divisions are connected to each other by first fasteners and all of the core divisions are affixed together in their circumferential displacement by second fasteners.

6. A magnet field type rotary electric apparatus as set forth in claim 5 wherein the fasteners comprise rivets and the first fasteners of adjacent of the individual core divisions are circumferentially offset from each other.

7. A magnet field type rotary electric apparatus as set forth in claim 6 wherein each of the adjacent individual core divisions are formed with clearance openings to clear the rivets of the first fasteners of the other one of the adjacent divisions.

8. A magnet field type rotary electric apparatus as set forth in claim 7 wherein $n \geq 3$.

* * * * *